United States Patent [19]

Nickoladze

[11] Patent Number: 4,701,691

[45] Date of Patent: Oct. 20, 1987

[54] SYNCHRONOUS GENERATORS

[76] Inventor: Leo G. Nickoladze, 1155 Kahili St., Kailua, Hi. 96734

[21] Appl. No.: 876,481

[22] Filed: Jun. 20, 1986

Related U.S. Application Data

[63] Continuation-in-part of Ser. No. 733,900, May 14, 1985, abandoned.

[51] Int. Cl.[4] ........................... H02P 9/42; H02P 9/48
[52] U.S. Cl. ...................................... 322/32; 310/112; 322/44
[58] Field of Search ...................... 322/29, 32, 61, 63, 322/44, 58; 307/84, 87; 310/112

[56] References Cited

U.S. PATENT DOCUMENTS

| | | | |
|---|---|---|---|
| 3,122,696 | 2/1964 | Graybeal et al. | 322/32 X |
| 3,183,431 | 5/1965 | Ford | 322/32 |
| 3,200,324 | 8/1965 | Wagner | 322/32 |
| 4,229,689 | 10/1980 | Nickoladze | 322/32 |

Primary Examiner—R. J. Hickey
Attorney, Agent, or Firm—I. Michael Bak-Boychuk

[57] ABSTRACT

In a compound electromechanical assembly having a first singly fed stage mounted for common rotation with a second singly fed stage mounted for common rotation with a second singly fed stage impedance is inserted in inverted connection to form an electrical loop between the secondaries. The impedance includes a resistor and capacitor connected in parallel.

15 Claims, 9 Drawing Figures

| R | C | WATTS AT RPM | AMPS | NOTES |
|---|---|---|---|---|
| 11.6Ω | 240MF | 2315 @ 1514RPM | 7.0A | |
| 11.6Ω | 300MF | 3880 @ 1380RPM | 10.0A | |
| 21.8Ω | 240MF | 3304 @ 1510RPM | 6.5A | |
| 5.8Ω | 0.0 | 2450 @ 1450RPM | 10.5A | MAX-RPM |
| 11.6Ω | 0.0 | 2510 @ 1776RPM | 10.0A | MAX-RPM |
| 0 | 0 | 2515 @ 1120RPM | 14.5A | MAX-RPM |

FIG. 9

SYNCHRONOUS GENERATORS

REFERENCE TO RELATED APPLICATIONS

This application is a continuation-in-part of U.S. patent application No. 06/733,900, now abandoned, filed May 14, 1985 by the same applicant. For the matter common with the prior application applicant claims the earlier filing date.

BACKGROUND OF THE INVENTION

1. Field of the Invention

The present invention relates to electrical generators, and more particularly to improvements in synchronous generators referenced to an AC signal.

2. Description of the Prior Art

In my prior U.S. Pat. No. 4,229,689, issued on Oct. 25, 1980, I have described a synchronous generator conformed for phase and frequency synchronized operation with the alternating signal of an AC power grid. This generator would then augment the power supplied by a central power station, like the electrical power produced by a public utility, with various local power sources such as windmills or water wheels. Augmentation of this kind matches the local power requirements with the local power available and thus matches the frequency and phase of the utility grid. The available local power, however, often varies in response to weather conditions and other local variables and a perfect match with the local demand is thus rare or more frequently non-existent. The utility grid thus provides, through averaging techniques, an effective power storage function against which power is drawn when the demand exceeds local supply and into which excess local power is transferred.

As a consequence a generator driven by a local, mechanical, power source will vary widely in rate, a variation heretofore less than fully resolved by inductive devices.

In the past, other portable generators typically took the form of an unregulated device producing electrical power at a frequency which depends on the mechanical input rate. Since this rate is often incompatible with the rate demanded by the device drawing the power, the typical approach has been either to constrain the generator to a governed rotational rate or to interpose an inverter fixed to a specific frequency. As a consequence the generator is often not optimized for its operating rate resulting in substantial losses in efficiency.

To a large extent the wide range of shaft rates has been accommodated in my prior U.S. Pat. No. 4,229,689. Nonetheless, the second order effects of induction present constraints on the efficiency and/or dynamic range which have led to further improvements described herein.

Simply, mechanical geometry and electromagnetic effects resolve themselves into various rate optima depending on detailed effects. The present generator lends itself uniquely to controlled response by which the physical constraints and geometry can be corrected out. Thus the complement of generator sizes can be conveniently reduced and, more importantly, the operating range of each size is substantially expanded.

Accordingly, a technique for expanding the operating range of synchronous generators is disclosed herein with particular reference to the teachings of U.S. Pat. No. 4,229,689.

SUMMARY OF THE INVENTION

It is, therefore, the general purpose and object of the present invention to provide a generator assembly conformed to be driven by alternate sources of mechanical power and adapted to optimize the output thereof under various input power conditions.

Other objects of the invention are to provide a convenient, portable generator conformed for consistent optimal use of various mechanical power sources.

Yet further objects of the invention are to provide a portable electrical generator which is self regulated to a selected frequency and optimized generation.

The foregoing and other objects are achieved in a structure which preferably corresponds to the teaching of my prior U.S. Pat. No. 4,229,689 improved to include control mechanisms and reactive and resistive components in the rotor connections. For a detailed prefatory discourse one should refer to the teachings of this earlier patent which, generally, discloses a structure including an exciter stator and a generator stator both tied to the utility grid with a common rotor assembly advancing an exciter rotor and a generator rotor on their interior. Both the rotor stages are wound and interconnected to each other by an inverse connection.

As result the second order components passing across the rotor stages become amplified with significant results. Such second order, or higher, terms however lack analytical precision and are best comprehended with attention to the first order terms.

Thus, the foregoing system can be analytically generalized in its first order terms as follows:

1. When an external mechanical power source, hereinafter referred to as the "prime mover", produces a mechanical rate expressed as "N", and a utility grid produces an electrical reference frequency expressed as "F", the magnetic field rate MS in the exciter stator having a P number of poles is then expressed as:

$$MS = F/P \tag{1}$$

2. By selecting a direction of rotation of this magnetic field MS to be the same as the direction of rotation of the prime mover N the relative rate RR of the exciter rotor poles within the exciter stator is:

$$RR = N - MS \tag{2}$$

3. The induced current frequency in the exciter rotor, expressed as frequency FR, will then resolve itself as:

$$FR = P(N - MS) \tag{3}$$

or $$FR = PN - F \tag{4}$$

4. This induced current will then generate a resulting magnetic field RE rotating relative the exciter rotor as follows:

$$RE = N - F/P \tag{5}$$

or $$RE = N - MS$$

5. Since the generator rotor is connected in opposite direction to the exciter rotor its relative magnetic field will rotate in the opposite direction, shown herein as -RE. The generator rotor magnetic field will therefore be equal to N−RE and the induced frequency SG in the generator stator will therefore be shown as:

$$SG = P \times N - RE. \tag{6}$$

6. By substitution of the identities set out in Paragraphs 1-5 the output frequency SG then resolves itself as:

$$SG = P(N - (N - F/P)) \tag{7}$$

or $$SG = F \tag{8}$$

which is the frequency of the utility grid. Accordingly, regardless of the rate N of the prime mover the output frequency will consistently be the frequency F of the grid.

One, of course, will note that the foregoing relationships are only generally indicative of the first order terms of this device. In practice, various second order terms appear because the device now carries rotor current induced in the other rotor stage. Thus, the effects associated with synchronous (doubly fed) devices appear in the form of phase angles, slip angles, cross induction, back EMF and others, effects which are most pronounced with frequency.

In a typical inductive single fed rotary device the coupling between the primary and secondary windings analytically approximate the coupling between the primary and secondary of a transformer. The inductive generator previously described by me in my U.S. Pat. No. 4,229,689 approximates two cross-connected secondaries fixed between two parallel primary windings, i.e., a configuration in which substantial current loops are induced in the secondary which then appear to the stators as a separately fed rotor stage. These current loops, by reverse induction, thus provide an opposite effect (asymmetric effect) on the primary windings. Since the secondaries are fixed on a common rotary shaft, this asymmetric effect results in an asymmetric reverse electromotive force (back EMF) into the exciter and generator stators.

This phenomenon, associated with the inverted connection of the rotor windings previously described, will greatly enhance the effect of second order terms. For example, at selected phase alignments of the stator of one stage may be acting as a motor while the other generates electrical power. The EMF for a generator, in turn, is in opposite phase displacement to that of a motor. Thus, any shaft rate N will concurrently impress onto the cross connected rotor a superposed EMF which responds well to phase control by reactive components and resistance.

While the foregoing discourse conforms with observed effects it should be noted that the exact analytical treatment is exceedingly difficult. The discussion that follows, therefore, is limited to some singular aspects which may intuitively explain the phenomena entailed.

One should note that the EMF induced into a winding follows the relationship:

$$e = wK\sin wt \tag{9}$$

where w is the rotational rate relative the magnetic vector, or FR in radians (2 π FR) and K is a constant of construction. The rotor shaft rate, in turn, is a function of torque which resolves itself as the slip S or $$S = FR - n \tag{10}$$

where n is the actual shaft rate relative the magnetic vector. Simply, in a singly fed inductive device the rotor speed can never reach synchronous speed since at that point no torque exists. In a doubly fed device, however, best performance is achieved at synchronous rates.

The slip rates S for an inductive exciter and an inductive generator are, however, opposite, i.e. in opposite directions relative shaft speed. Torque T can be expressed in terms of equivalent rotor resistance as:

$$T = RE = r/S(1-S) \tag{11}$$

where r is the winding resistance and S is the slip rate.

A singly fed device, i.e., an induction device, requires a displacement between the flux field of the stator and the ampere-conductor distribution of the rotor in order to develop power. This comes about automatically in the form of slip rate. Where the rotor current also includes externally induced currents, i.e., the current induced in the other stage a compound result obtains with the beneficial aspects of both a synchronous and a singly fed configuration. It should be understood that the relative exciter and generator slip rates are opposite. In the cross-connected rotor stages these torques can be balanced out by the insertion of the balancing resistance and reactance into the rotor loop. This then distributes the torques between the exciter and generator stages, and each individual stage will therefore not limit the dynamic range of the device. Moreover, the reactive (capacitive) connection across this resistor will serve to reduce its effects as the input shaft rate increases.

Thus, the inventive device can be set to select an exciter - generator torque distribution by the expediently inserted resistance which is then augmented by capacitance. As result substantial increases in operating (dynamic) range are obtained along with all the benefits of a synchronous device.

Expressing the foregoing relationships in terms of magnetic quantities the following results:

(a) The flux density of any electromagnetic device can be expressed in terms of Ampere's Law as:

$$B = \frac{MIS}{2\pi r} \tag{12}$$

where U is the magnetic property of the medium (a constant), r is the radial distance from the conductor and IS is the current through the conductor.

(b) The magnetomotive force, in turn, is expressed in classical terms as follows:

$$F = IR1B \tag{13}$$

where IR is the current in a conductive element of a length l exposed to the flux B.

(c) Accordingly, the torque T in an induction device is expressed as:

$$T = Fxr = \frac{MIS}{2\pi r} \times IR1 \times r \tag{14}$$

or $$T = KIS \times IR \quad (14)$$

(d) In a compound device like that described in my prior patent the shaft input torque TIN applied to the rotor must resolve itself between the torques of the exciter and generator stages TE and TG. Thus:

$$TIN = TE + TG \quad (15)$$

The torque TE, in turn, is a product of the exciter field current and the rotor current which is reversed for the generator torque TG. Thus for a cross-connected rotor assembly the reflected shaft torque TIN resolves as follows:

$$TIN = (I_{SE} - I_{SG}) \times KIR \quad (16)$$

where $I_{SE}$ is the exciter stator current and $I_{SG}$ is the generator stator current. This, of course, corresponds with intuitive perception in which the electrical power out corresponds to the mechanical power input.

One should note that the foregoing relationships are fully idealized and contain no losses. In practice losses appear which are generally associated or grouped into static losses and losses arising from rotation. Static losses are exemplified by terms like the core losses and losses due to winding resistance (copper loss) and rotary losses may be exemplified by power factor shifts in the rotor. These losses are well known and require little elaboration. Nonetheless, their perception is necessary at this point for the discourse that follows.

(e) In a rotary induction device, i.e., an induction motor or generator, the no load induced magnetomotive force wave (mmf wave) induced in the rotor by the stator flux field is in quadrature with the stator. While this relative mmf vector alignment provides maximum trigonometric result, the no load induced rotor current is close to zero. Simply, an inductive device requires some slip S in order to develop power, which resolves as follows:

$$I_{ROT} = \frac{SE}{R + J \times S} \quad (17)$$

$I_{ROT}$ thus is the known term for slip frequency current, or alternatively the power transferred across the airgap from the stator to the rotor.

(f) But then the equivalent circuit for a rotary induction device shows an interesting simplification in which the mechanical shaft load (torque) can be replaced by a variable rotor winding resistance RV. Since torque in an induction device is known to relate directly to slip rate S this simplification produces the following equivalence:

$$T \cong R_V \cong r_2 \left( \frac{1-S}{S} \right) \quad (18)$$

where the term $r_2$ is the winding resistance of the rotor and S is the slip rate expressed as a ratio of rotor rate difference over the ideal field rate. Expressed in the terms stated above:

$$S = \frac{MS - N}{MS} \quad (19)$$

(g) Thus the torque relationship expressed in equation (15) and repeated here for convenience as:

$$TIN = TE + TG$$

and can be restated as:

$$TIN = R_{VE} + R_{VG}$$
$$= r_{2E}\left(\frac{1-S_E}{S_E}\right) + r_{2G}\left(\frac{1-S_G}{S_G}\right)$$

or $$TIN = r_{2E}\left(\frac{1 - \frac{RE}{MS}}{\frac{RE}{MS}}\right) + r_{2G}\left(\frac{1 + \frac{RE}{MS}}{\frac{RE}{MS}}\right)$$

which is further reducible by the algebraic relationship in (15) as:

$$TIN = r_{2E}\left(\frac{MS}{RE} + 1\right) + r_{2G}\left(\frac{MS}{RE} + 1\right) \quad (20)$$

By selecting rotor stages which are substantially equal in winding resistance (i.e. $r_{2E} \cong r_{2G}$ the foregoing torque relationship becomes:

$$TIN \cong 2r_{2E}\left(\frac{MS}{RE}\right) \quad (21)$$

Accordingly, an extremely unusual and interesting effect has been discovered in which the slip rate S inherent in the operation of any inductive device is augmented by what appears as a second feed which, in turn, is directly replaced by the relative rotational rate RE of the rotor magnetic vectors. Of course, this apparent second feed superposed on the slip rate results in alterations in the power factor of the rotor current loop. Thus the following effects are achieved:

(i) The imposed, opposite slip rate (S=RE) in the exciter and rotor stages forces one to act as a combination of singly and doubly fed inductive motor and generator. (See relationships (20) and (21);

(ii) At a shaft torque level $T_{MIN}$ which just compensates the losses in the device the power draw to excite the rotor is just equal to the power replaced by the generator section and at this point a synchronous (doubly fed) relationship is obtained.

(iii) At all higher shaft torque levels a positive power balance is obtained resolved as a net torque TIN by the relative, imposed, slip terms RE which does not suffer from the low torques at synchronous speed of a singly fed device.

(iv) The resulting mismatch of the rotor power factor and higher frequency terms are balanced by the insertion of resistance and capacitance in the rotor loop.

Thus, the inverted (push-pull) rotor connection substantially reduces the effect that is normally associated with a singly fed device. Moreover, intentional insertion of resistance into the rotor loop provides a potential (drop) across which the torques are effectively balanced. This insertion of resistance (and reactance) greatly expands the operating (dynamic) range of the generator assembly without the necessity of continual phase adjustments of the stators.

DESCRIPTION OF THE PREFERRED EMBODIMENT

Figure 1:
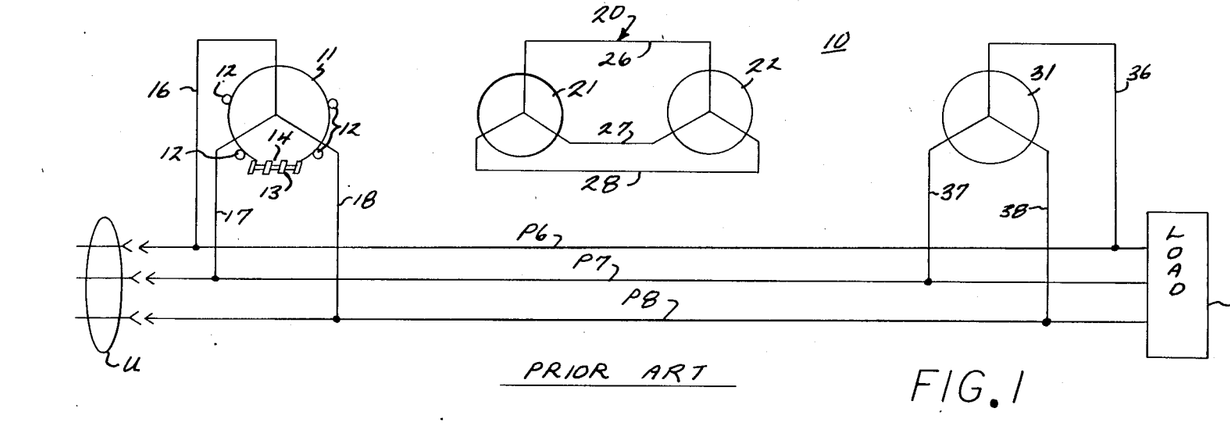
FIG. 1 is a diagrammatic illustration of a prior art synchronous generator useful with the invention herein.

As shown in FIG. 1 a prior art synchronous generator of the type previously described by me in my U.S. Pat. No. 4,229,689, is generally illustrated herein at 10 and for purposes of completeness of the instant disclosure is shown to include an exciter stator 11 mounted on rollers 12 for angular motion in response to the rotary advancement of a worm gear 13 engaging a rack segment 14. This exciter stator is generally of an annular construction provided with a plurality of magnetic pole pieces each having wound thereabout a corresponding electrical lead shown as electrical leads 16, 17 and 18. Received within the annular interior of the exciter stator is one segment of a rotor, generally shown at 20, including an exciter rotor section 21 aligned for rotation inside the magnetic pole pieces of the stator 11. Rotor 21, similar to stator 11, includes its own set of magnetic pole pieces each again wound by an electric lead shown as electrical leads 26, 27 and 28. These same electrical leads pass to the other segment of the rotor 20, shown herein as the generator rotor stage 22, as previously described, being connected in opposite polarity to the exciter rotor 21. Thus, the electrical leads 26, 27 and 28 form oppositely aligned and directed magnetic vectors in rotor stages 21 and 22 as a consequence to any induced current passed therein. Rotor stage 22, moreover, is received within the interior of a generator stator 31, once again provided with the same number of poles as the exciter stator 11 and including electrical leads wound around each pole shown as electrical leads 36, 37 and 38. Leads 16, 17 and 18 and 36, 37 and 38 are respectively connected to a three-phase line P6, P7 and P8 which are then plugged into a utility grid shown generally at U.

In the foregoing discourse certain descriptive generalities have been taken with respect to the matter disclosed in my prior patent and the summary stated above is thus not intended to modify, amend or effect the scope of my prior invention and is only intended to set the bases for the matter disclosed herein.

Figure 2:
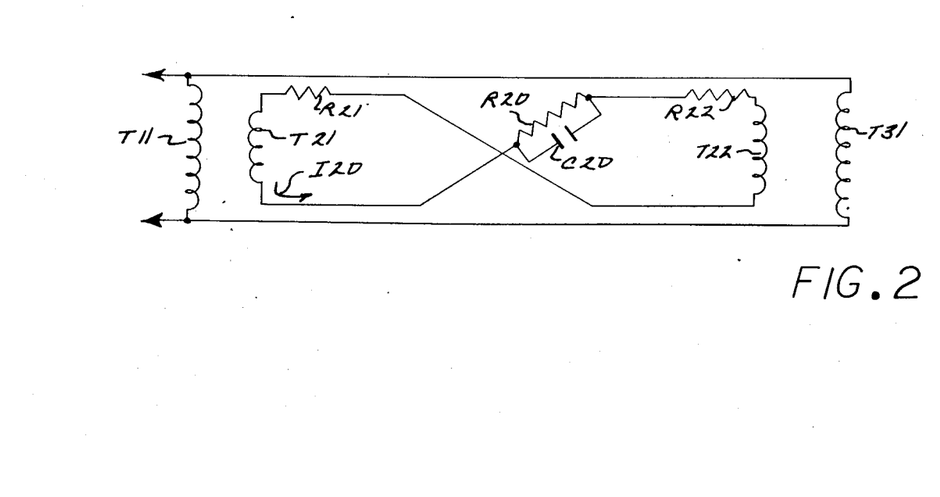
FIG. 2 is a transformer equivalent diagram of an induction device illustrating the inventive modifications discussed herein.

Classical theory offers a transformer equivalent for inductive devices which is set out in simplified form in FIG. 2 and expanded to cross connected rotor stages. As shown in this figure the windings of the exciter stator 11 are set as an equivalent transformer primary T11 and the generator stator windings 31 appear as a winding T31. The windings of the rotor then appear as secondaries T21 and T22. Each of the secondaries is, moreover, associated with its own winding resistance R21 and R22. Since the secondaries are cross connected to each other the consequent circuit sets out a current loop I20 which in the ordinary case is limited by the series resistance R21 and R22.

This approximation, however, fails to fully attend to the power factor terms of a wound rotating device. Accordingly, a partial reference is necessary to FIG. 3 in which the foregoing transformer equivalent is expanded to accommodate the terms associated with rotation.

Figure 3:
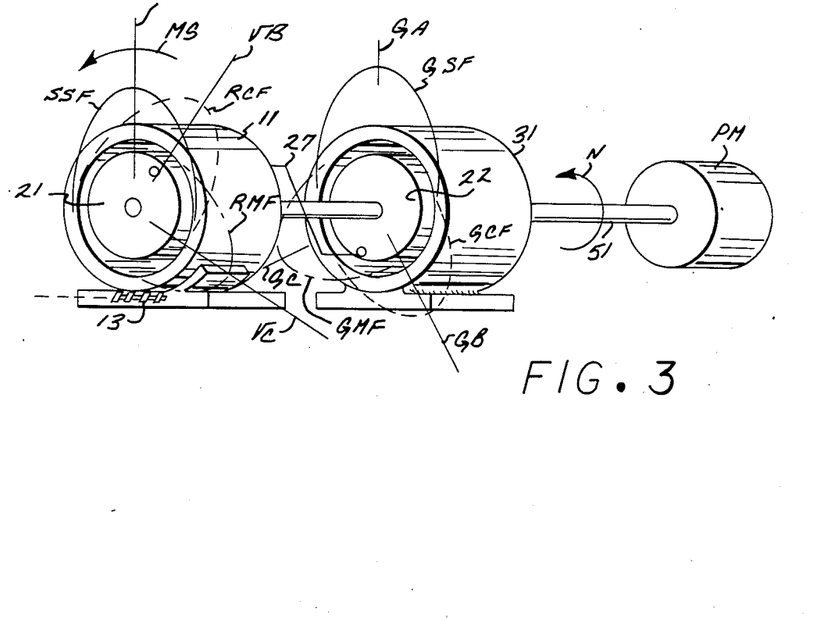
FIG. 3 is a perspective diagram of an induction device combination illustrating the progression of the various current and flux patterns therein.

As shown in FIG. 3 the exciter stator 11 will exhibit a sinusoidally shaped flux field SSF rotating at the rate MS and aligned along the vector VS. Flux field SSF will then induce in the exciter rotor a rotor current field (sheet) RCF lagging behind vector VA at a lagging vector VB which then results in an orthogonal rotor magnetomotive wave RMF along a vector VC. The exciter rotor 21, in turn, is fixed to a common shaft 51 driven in rotation at the shaft rate N by a prime mover PM. As previously set out the resulting rate of vector VC relative the shaft 51 is the sum of the rate MS and the shaft rate N. Since the rotor windings of rotor 21 and rotor 22 are cross connected, as exemplified by lead 27, the mmf wave GMF in the generator rotor aligns along a vector GC at an alignment substantially out of phase with vector VC. The local current curve GCF then aligns at a vector GB to induce (generate) a power output GSF at a vector GA. It should be noted, per relationship 1-10 previously set out, the rate and phase of vector GA is consistent with the rate MS of vector VA. The consequent induced current wave forms in rotors 21 and 22 are generally opposite and accordingly effect the push-pull induction previously described. Nonetheless, because of the cross-connection the rate of vector GC relative its field vector GA will be higher than the rate of vector VC relative VA. Thus, two distinct relative frequencies are impressed, which can then be controlled (attenuated) by a series connection of an R-C network (220 and C20).

This then resolves itself into the mmf wave forms RMF and GMF which provide the in-phase waveforms SSF and GSF in stators 11 and 31. Of course, some phase misalignment may exist which may be compensated by turning screw 13 which, in turn, will advance stator 11 relative stator 31. Accordingly, a substantially complete push-pull effect can be achieved which then responds well to the transformer approximation in FIG. 2.

Referring back to FIG. 2 the inverted circuit equivalent provides an effective current gain in the secondary loop. This gain expresses the current ratio of an inverted against an uninverted configuration of the secondary loop. The singular aspect of this circuit, however, is in the out-of-phase components of the secondary loop, i.e., its power factor. By inserting a resistor R20 into the current loop I20 which is two or more times greater than the out-of-phase equivalent real or in phase power is realized in the secondary and since the current gain is high little loss occurs as a consequence. To further control the power factor a capacitor C20 may also be inserted which then also selects the higher frequency. In this manner the power factor problems associated with the imposed slip rates RE are effectively taken out without a significant reduction in efficiency. The device thus implemented will then accommodate a wide range of shaft rates N in total distinction to the limited dynamic range of conventional inductive devices, and at the same time shall produce a fully synchronized power output.

Figure 4:
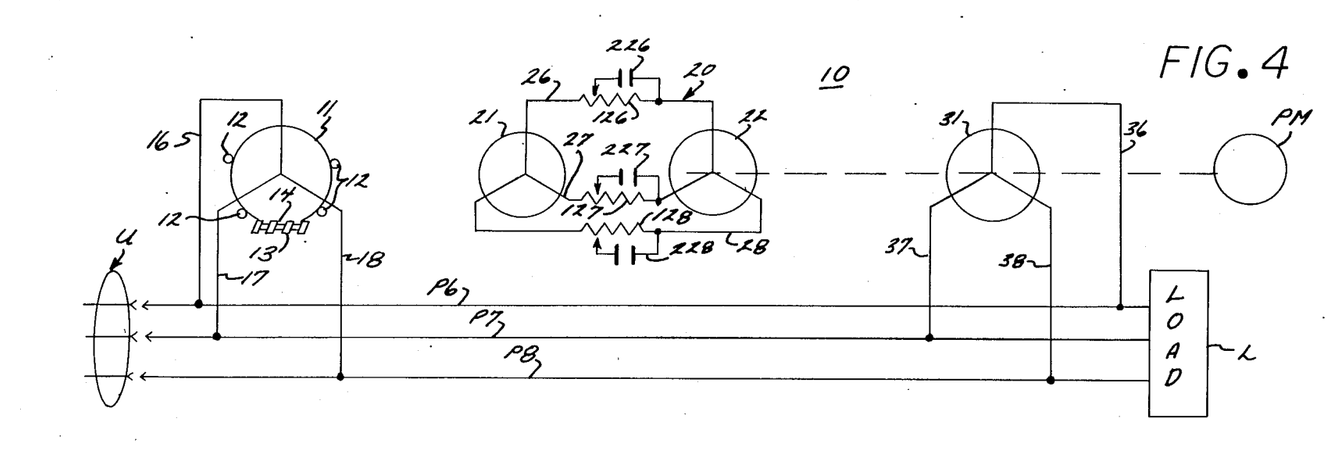
FIG. 4 is yet another diagrammatic illustration of a synchronous generator constructed in accordance with the present invention.

By reference to FIG. 4 the equivalent to resistor R20 and capacitor C20 is provided by inserting potentiometers 126, 127 and 128 in circuit with the leads 26, 27 and 28 of the rotor assembly 20 described in FIG. 1. Connected between the wiper of each potentiometer and one end thereof are corresponding capacitors 226, 227 and 228. As thus modified, the previously described device 10 will then operate in accordance with the equivalents in FIGS. 2 and 3, the remaining parts and elements being implemented in accordance with the prior teachings and thus similarly numbered. Thus a prime mover PM may drive the rotor assembly 20 over a wide range of speeds N without incurring the limitations of optimum slip rate normally present in singly fed inductive devices.

Figure 5:
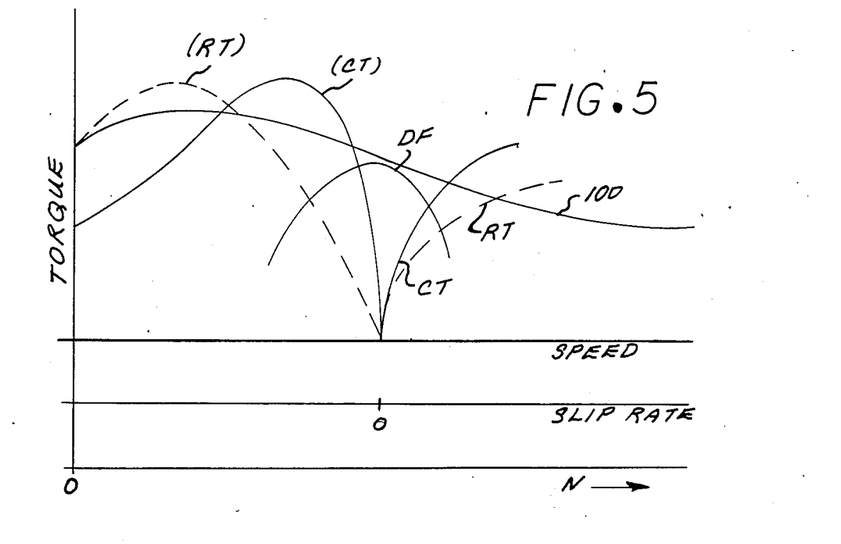
FIG. 5 is a graphical illustration of the torques associated with the rotating fields disclosed herein.

By reference to FIG. 5 the benefits obtained herein are readily apparent. For example, a conventional inductive generator (or motor) will produce a shaft torque which varies as curve CT and (CT). When rotor resistance is added the torque curve shifts downward in speed as shown by the curve RT and (RT). A synchronous (doubly fed) device will, however, exhibit best performance at slip rates close to zero shown as curve Df. The combination of these effects is thus utilized. Accordingly, a similarly rated synchronous generator, as that described above, will follow a torque (or power output) curve 100 which, unlike curves CT and RT, does not fall off to zero as the slip rate falls off to zero.

Thus the power developed by the instant device increases with the shaft rate N (i.e., torque of curve $100 \times N$) and is essentially limited only by the current capacity of the windings. There simply is no slip rate limit (S=0) since in each instance an imposed slip rate RE exists. Accordingly, substantial benefits are obtained without running into the "rated" speed limitation of a conventional device.

It should be noted that the phenomena discussed above represent an attempt at comprehension of a relatively complex effect. The wave forms in the cross-connected rotors become exceedingly complex and thus do not lend themselves to convenient analytical treatment. Nonetheless the explanation offered appears to conform with observed results and with conventional understanding of singly and separately fed induction devices.

Figure 6:
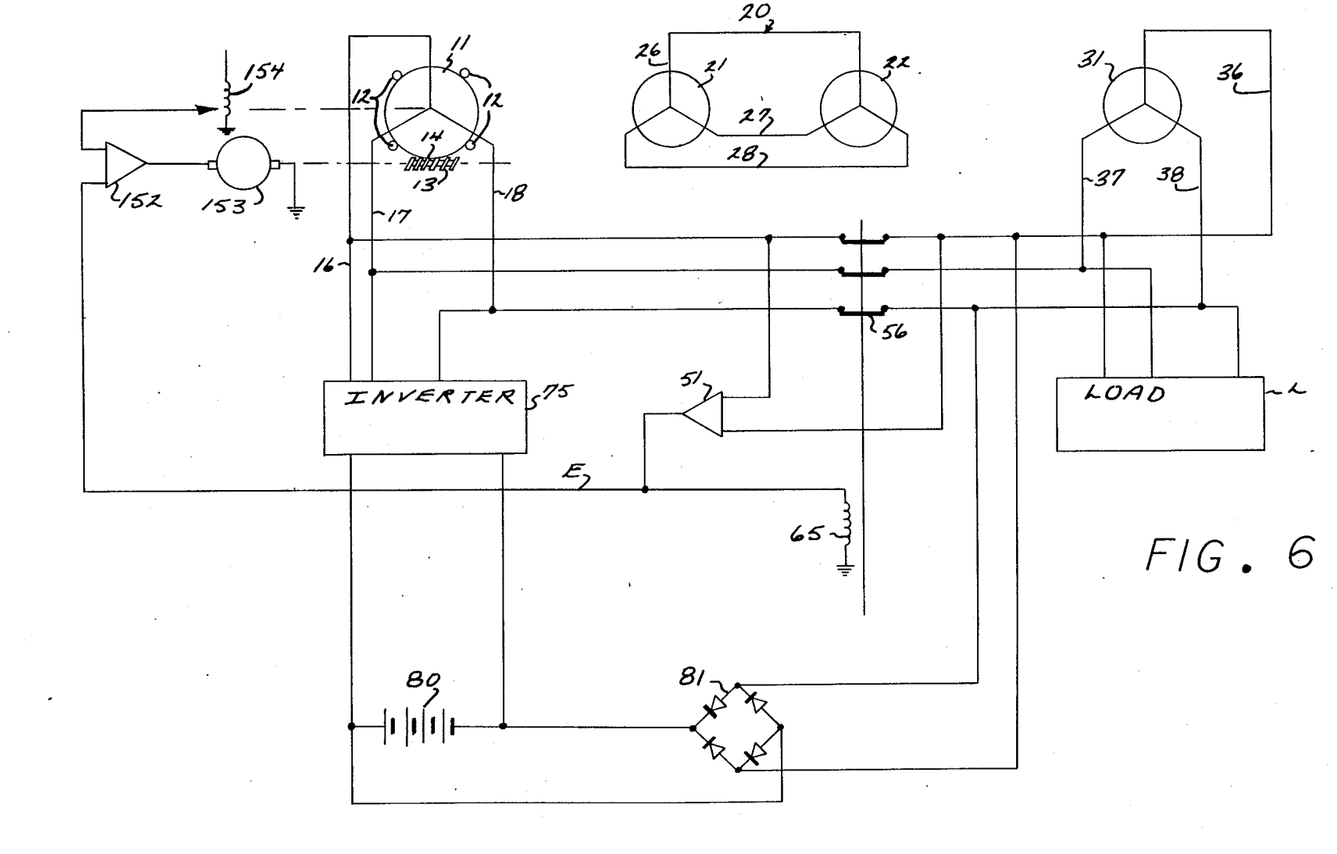
FIG. 6 is a diagrammatic illustration of yet another implementation of the invention herein.

The foregoing configuration may be further implemented to accommodate remote use and starting torque in equali as illustrated in FIG. 6. As shown in this figure one of the leads 36, 37 or 38 is fed to a phase comparator (differential amplifier) 151 which, at its other input, receives the corresponding lead from the exciter stator 11. Thus, comparator 151 compares the signals on leads 16 and 36 to produce a difference signal E to a servo amplifier 152 driving a servo motor 153 connected (through gearing or otherwise) to the worm gear 13. The angular position of worm gear 13 and thus the angular position of the stator 11 is then picked off through the position of a potentiometer 154 to provide a position feed-back signal to amplifier 152 to complete the loop.

Accordingly, an angular error signal E is provided in response to the phase difference between the signals on leads 16 and 36 and will be nulled out by the appropriate correction in the stator alignment. Concurrently, this error signal E passes through a solenoid coil 65 to pull open a spring-loaded gang switch 56 forming the connection between leads 16 and 36, 17 and 37 and 18 and 38.

As a consequence when switch 156 is closed amplifier 151 will see no difference between stators 11 and 31. That difference in phase prior to closure, however, concurrently invokes servo motor response to adjust the angular alignment of stator 11 which continues until the error signal E is virtually nulled out and thus the stators are substantially aligned upon circuit closure. In this manner correct stator alignment occurs with the generator decoupled from the power system and connection is only made when close matching occurs.

Leads 16, 17 and 18, moreover, may connect to an inverter 75 and thus carry thereon the inverter output of a selected frequency and phase. Accordingly, the phase angle adjustment will continue until full phase alignment is made between inverter 75, stator 11 and stator 31 which is tied to the lead L, thus fixing the output of the generator to the angles of the load. Inverter 75 is, furthermore, connected to a battery 80 which may be recharged by a full wave rectifier 81 connected across two of the output leads from the generator stage 31.

A load L across leads 36, 37 and 38 will then receive power fixed to the frequency rate and phase angle of inverter 75 and on each occurrence of a substantial phase change due to the change in load L a servo correction will follow to correct the phase differences in the circuit. Accordingly, a self-correcting, battery powered, inverter referenced generator is provided which is available for use with any prime mover such as a windmill or a waterwheel and can be therefore conveniently set up in remote areas. Of course, any inverter of commercial quality may be useful herein and the necessity of the description of the features thereof is therefore not required, and the rotor assembly 20 includes the foregoing series impedances to accommodate prime mover variations.

Figure 7:
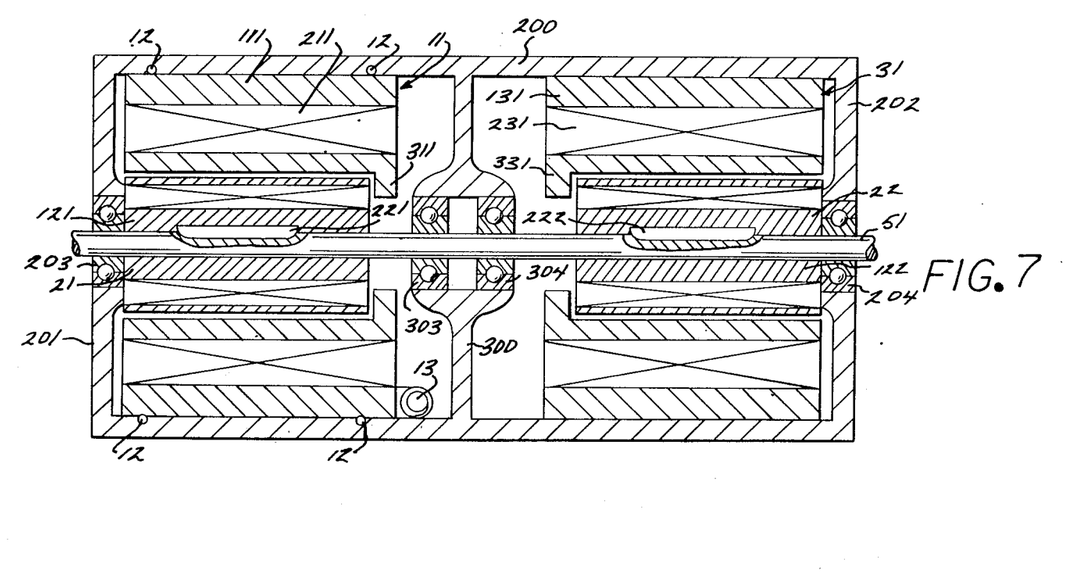
FIG. 7 is a sectional view of a mechanical arrangement useful with the invention herein.

In each instance the potential is present of cross-coupling of the magnetic flux between the rotor stages. Thus, the field winding pole pieces may be shaped to shade or shield in the manner shown in FIG. 7. As shown in this figure each of the stators 11 and 31 includes a corresponding corepiece 111 and 131 which, in conventional manner, carries the field windings 211 and 231. Core piece 111 is mounted on rollers 12 for advancement by the screw 13 within the interior of a common cylindrical housing 200. Housing 200 includes end plates 201 and 202 each supporting a bearing 203 and 204 supporting shaft 51 keyed by keys 221 and 222 to core pieces 121 and 122 forming rotors 21 and 22. In order to isolate the magnetic flux of core piece 121 from that of piece 122 both core pieces 111 and 131 include shielding rings 311 and 331 which align to collect the fringe flux patterns of the rotor core pieces rotating therein. To further effect isolation shaft 51 may be made of nonmagnetic material and may be center supported by bearings 303 and 304 in a center web 300.

Figure 8:
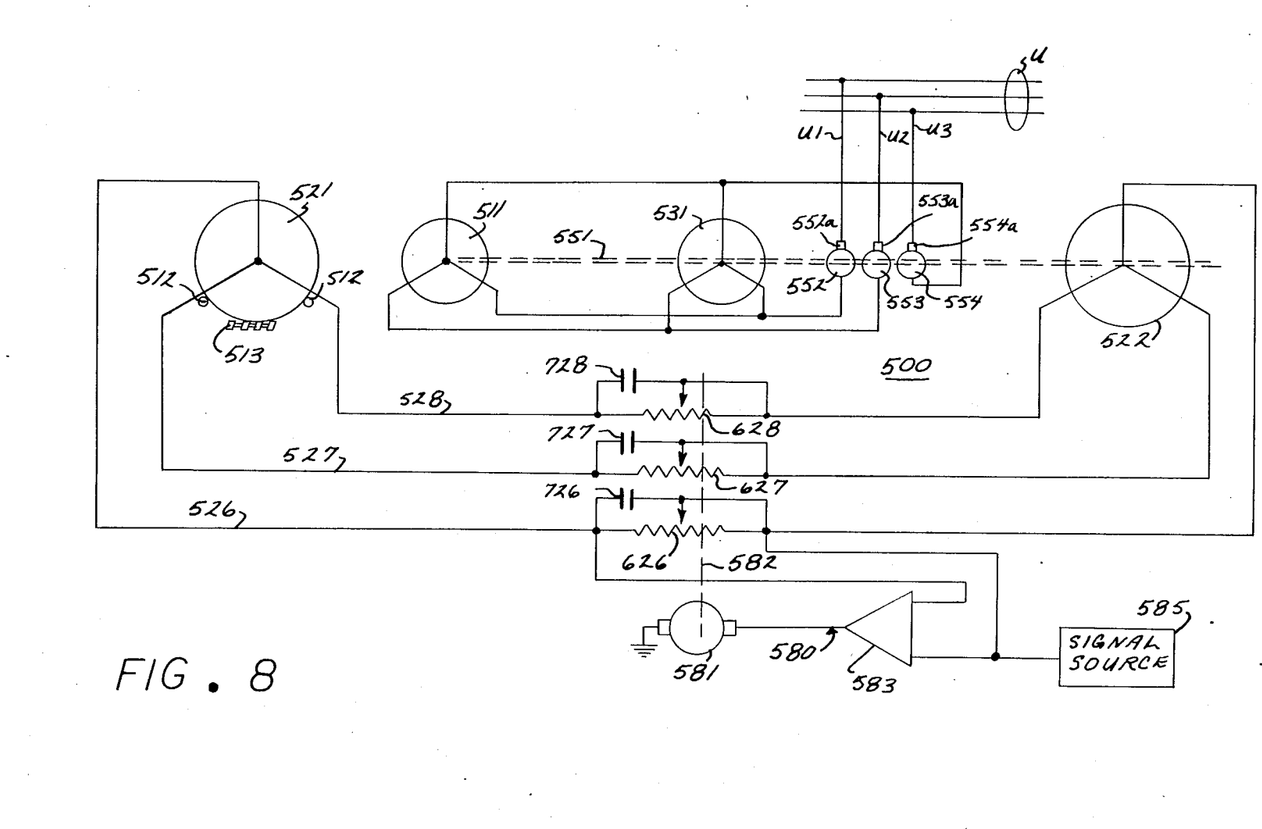
FIG. 8 is a diagrammatic illustration of a further alternative of the invention herein.

As shown in FIG. 8 an alternative implementation shown generally at 500, comprises a shaft 551 including slip rings 552, 553 and 554 mounted at one end thereof. Each slip ring, in turn, maintains sliding contact with a corresponding wiper 552a, 553a and 554a connected to leads U1, U2 and U3 of a three-phase public utility grid U. Rings 552, 553 and 554 then connect in parallel to the windings of a first stator assembly 511 and a second stator assembly 531 which in this case are mounted for common rotation on shaft 551. Accordingly, in this instance the operation of the rotors and the stators is reversed from that previously set out and the stators are therefore in rotation.

Stators 511 and 531 are aligned for rotation within the interior of stationary rotors 521 and 522 of annular 3-phase configuration like the stators 11 and 31. In this instance the stationary rotors are, again, interconnected in an inverted connection by leads 526, 527 and 528 each provided with a corresponding potentiometer 626, 627 and 628. Once again, in parallel with capacitors 726, 727 and 728.

Thus, the potentiometers, now stationary, are available for either manual or automated control exemplified herein by a servo loop 580 comprising a motor 581 connected in common by a shaft 582 to the wipers of each potentiometer. The servo motor 581, in turn, is driven by an amplifier 583 which responds to the voltage difference across one of the potentiometers, e.g., potentiometer 626 and a control signal input from a reference source 585. Accordingly, control is obtained over the relative amplitude of the curve DF in FIG. 5 and thus the power of output of the device. Of course, the stationary rotor 521 may, furthermore, be controlled in phase by rotation achieved through rollers 512 and a screw arrangement 513.

Figure 9:
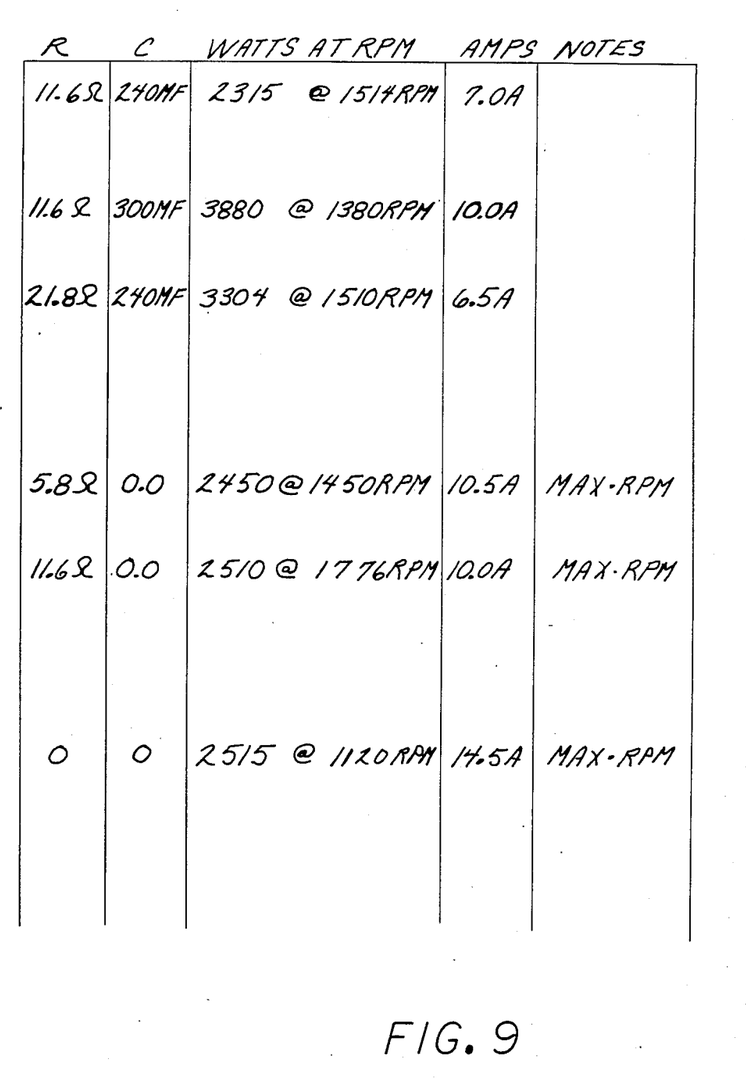
FIG. 9 is a table including test data for various values of resistance and capacitance in the secondary circuit.

In FIG. 9, some exemplary results are collected for inductive configurations of 2.5 KW rating conforming to the present teachings. As will be observed substantial dynamic range expansion is achieved at power curves which follow the shaft rate N. Those skilled in the art therefore take benefit of this data in practicing the invention herein.

Obviously many modifications and changes may be made to the foregoing description without departing from the spirit of the invention. It is therefore intended that the scope of the invention be determined solely on the claims appended hereto.

What is claimed is:

1. In a line synchronized generator assembly comprising a first and second, substantially coaxial, annular stator each provided with wound poles connected to said line and a first and second inductive rotor each provided with a corresponding winding and mounted on a common rotary shaft received respectively in the interior of said first and second stator, said first and second rotors having said winding thereof interconnected in inverted connection, the improvement comprising:
an impedance assembly inserted between said first and second rotor each said impedance assembly including a resistor connected in parallel with a capacitor for providing impedance in the inverted connections thereof.

2. Apparatus according to claim 1 wherein said resistor is adjustable in the electrical resistance thereof.

3. A rotary inductive device for generating electrical power at a frequency equal to a reference frequency for varied rates of rotation thereof comprising:
a first and second annular stator each including electrical windings for developing electromagnetic flux therebetween and said first and second annular stators being coaxially aligned;
a rotary shaft extending centrally through the annular interiors of said first and second stator;
a first and second rotor mounted on said shaft and aligned within the annular interiors of said first and second stators each said rotor including windings for inductive coupling in said flux; and
connecting means for providing an inverted connection between said windings of said first and second rotors inlcuding elements of electrical impedance.

4. Apparatus according to claim 3 wherein:
said elements of electrical impedance include electrical resistance and reactance in parallel connection.

5. Apparatus according to claim 4 wherein:
said electrical resistance is adjustable.

6. Apparatus according to claim 3 further including:
an electrical inverter connected in parallel to said first and second stators; and
power generating means interconnected between said inverter and said second stator.

7. Apparatus according to claim 6 further comprising:
switch means connected between said first and second stator and rendered operative in response to the phase difference therebetween.

8. In a synchronous generator characterized by an exciter stator and a generator stator conformed to receive on the interiors thereof an exciter rotor and a generator rotor, said rotors being mounted on a common shaft for rotary articulation by a prime mover, said exciter rotor being electrically connected to said generator rotor the improvement comprising:
an inverter electrically connected at the output thereof to said exciter stator;
a battery connected to said inverter; phase comparing means connected between said exciter stator and said generator stator for comparing the electrical signals therein and for producing an output signal indicative of the difference therebetween; and
correction means connected to receive said output signal and to articulate in angular motion said exciter stator in response to said output signal for rotating said exciter stator relative said generator stator to reduce said output signal.

9. Apparatus according to claim 8 wherein:
said exciter stator is electrically connected to said generator stator across a switch responsive to said output signal.

10. Apparatus according to claim 9 wherein:
said switch comprises a normally open solenoid switch conformed to be closed by said output signal.

11. In a generator characterized by an exciter stator and a generator stator conformed to receive on the interiors thereof a common rotor assembly including an exciter rotor electrically connected to a generator rotor, and phase means for angular positioning of said exciter stator relative said generator stator, the improvement comprising:
a first control system connected to sense the rotational rate of said rotor assembly and connected to said phase means for adjusting the angular position of said exciter stator relative said generator stator in a predetermined correspondence with said rotational rate;

an adjustable electrical excitation circuit connected to said exciter stator and generator stator;

a second control system connected to sense said rotational rate and said angular position and connected to adjust said excitation circuit for adjusting the ratio of excitation of said exciter stator and generator stator in a preselected correspondence with the combination of said rotational rate and angular position.

12. Apparatus according to claim 11 wherein:
said rotor assembly includes a central shaft; and
said first control system includes sensing means for sensing the rotational rate of said central shaft.

13. Apparatus according to claim 12 wherein:
said exciter rotor is substantially smaller than said generator rotor.

14. Apparatus according to claim 13 wherein:
said exciter and generator stators are formed as annular structures, said exciter stator having an interior opening smaller than said generator stator.

15. Apparatus according to claim 14 wherein:
said exciter and generator stators are coaxially mounted on the interior of a common housing.

* * * * *